M. A. BORN.
TROLLEY.
APPLICATION FILED OCT. 7, 1911.

1,065,771.

Patented June 24, 1913.

2 SHEETS—SHEET 1.

Witnesses
M. F. Garrett
John Cadmigan

Inventor
Martin A. Born
By Victor J. Evans
Attorney

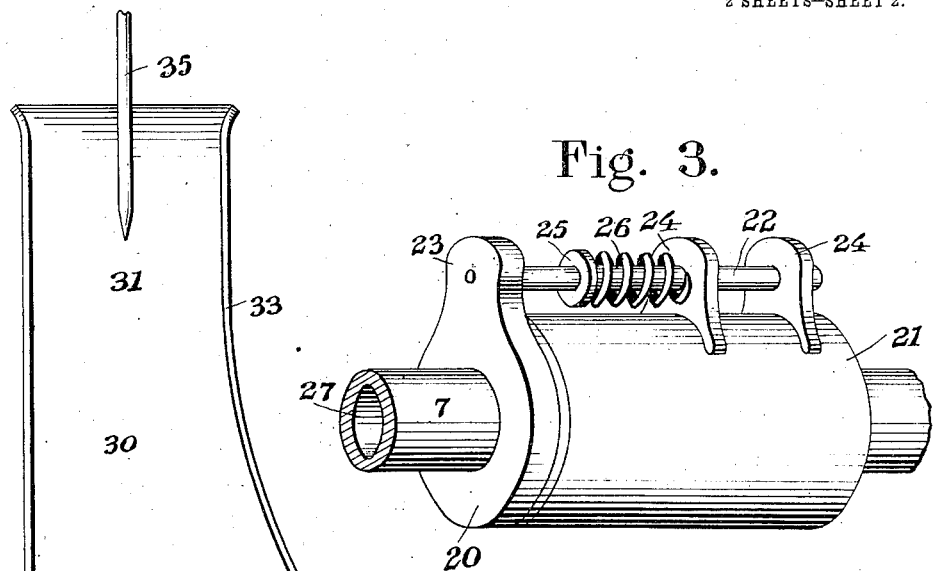
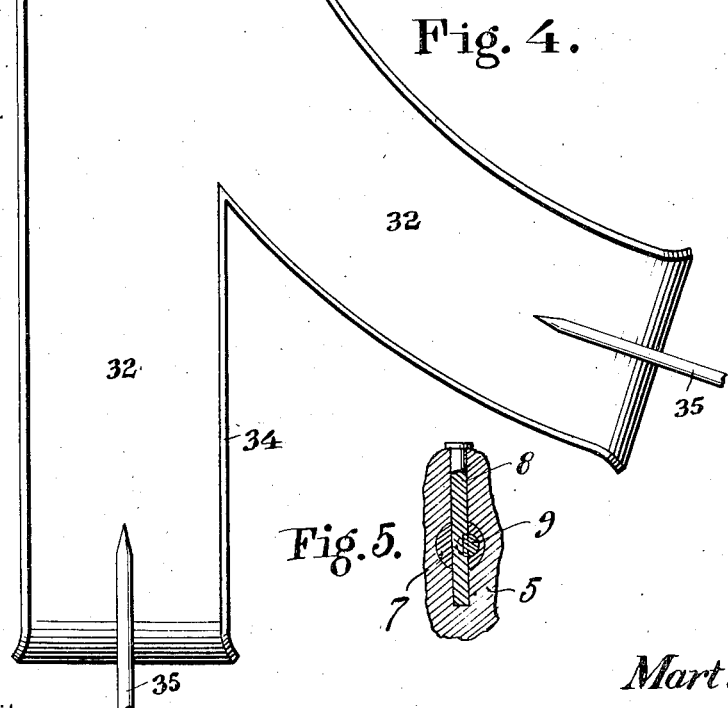
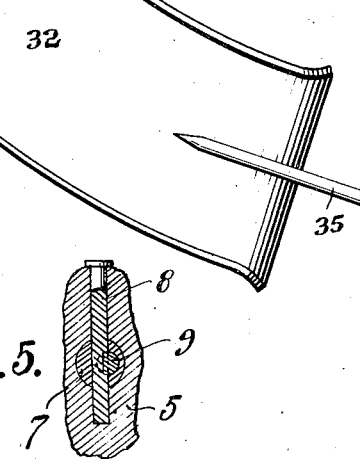

UNITED STATES PATENT OFFICE.

MARTIN A. BORN, OF OCONOMOWOC, WISCONSIN.

TROLLEY.

1,065,771.

Specification of Letters Patent.　Patented June 24, 1913.

Application filed October 7, 1911. Serial No. 653,330.

*To all whom it may concern:*

Be it known that I, MARTIN A. BORN, a citizen of the United States, residing at Oconomowoc, in the county of Waukesha and State of Wisconsin, have invented new and useful Improvements in Trolleys, of which the following is a specification.

The general object of the invention is to prevent displacement of a trolley wheel from the feed wire and particularly at the time the said wheel is passing over an element connecting feed wires which extend in different directions, such as those overlying a switch in the road.

Figure 1:
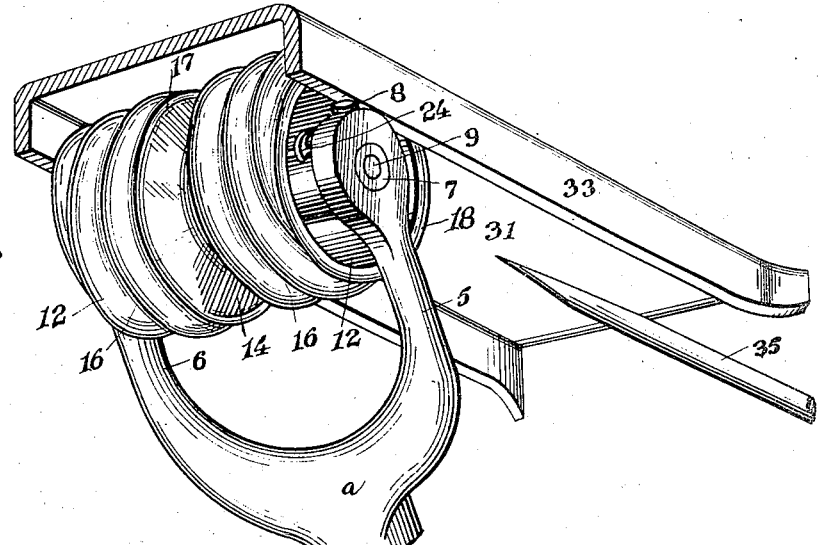
Figure 2:
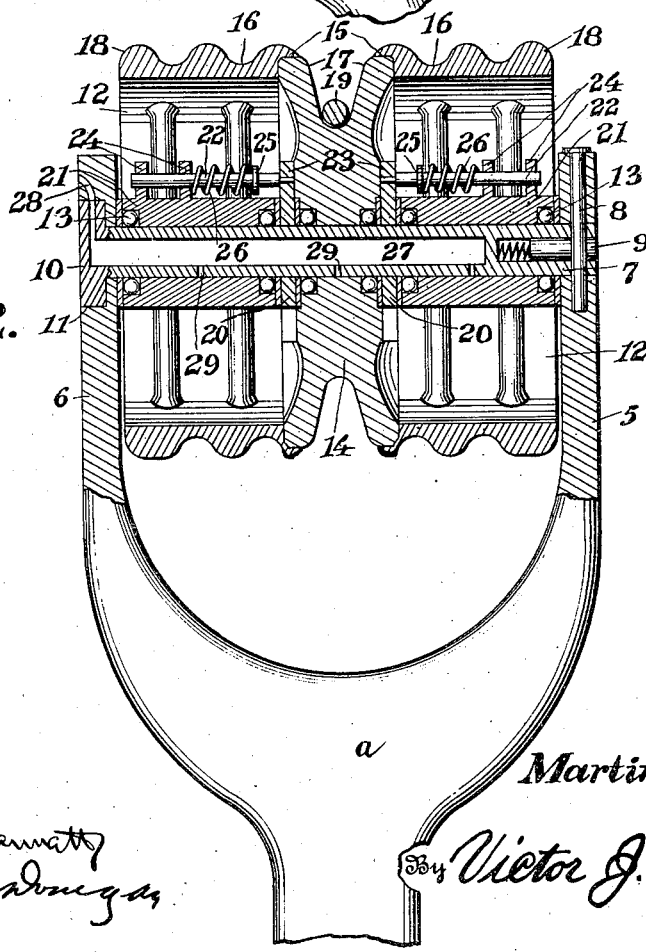

Other objects will appear and be better understood from the following description taken in connection with the accompanying drawings, in which, Figure 1 is a perspective of the device. Fig. 2 is a fragmentary sectional view illustrating the connection for preventing accidental displacement of the axle securing pin. Fig. 3 is a detail perspective of the parts for preserving electrical contact between the trolley and restoring wheels. Fig. 4 is a detail plan view of a switch plate for connecting the feed wires. Fig. 5 is a fragmentary sectional view illustrating the connection for securing the main axle against rotation.

*a* indicates generally, the harp, the sides 5 and 6 of which are provided with openings to receive the opposite ends of the axle 7 which is secured against rotation therein by means of a pin 8 passing through a longitudinal opening in one side of the harp such as the side 5, and also through a transverse opening in one end of the axle 7. The end of the axle 7 through which the pin 8 passes, has a spring-pressed key 9 arranged therein which passes through a slot in the pin 8, and serves to prevent accidental displacement of the pin.

10 indicates a head at that end of the axle opposite to the end through which the pin 8 passes, the said end being arranged in a countersunk 11 in the side 6 of the harp so that the outer face thereof will be flush with the outer face of the side 6.

12, 12 indicate the restoring wheels which are journaled on the opposite end portions of the axle 7 and between the sides 5 and 6 of the harp.

13, 13 indicate ball-bearings for the restoring wheels and 14 indicates the trolley wheel journaled on the axle 7 and interposed between the restoring wheels 12, 12.

Referring now to Fig. 2 it will be seen that the peripheral portions of the trolley wheel are angular in cross section and arranged in undercuts 15 in the opposed inner faces of the restoring wheels 12, 12. The frictional contact, however, between the trolley wheel and restoring wheels is not sufficient to prevent rotation of any wheel independently of the others.

16, 16 indicate spiral grooves formed in the peripheries of the restoring wheels 12, 12. The inner ends of these grooves merge into the opposite sides 17, 17 of the groove of the wheel 14, while their outer ends end at circular flanges 18, 18 on the outer faces of the restoring wheels 12, 12. Referring now to the drawings it will be seen that the groove of one wheel extends reversely to that of the other, and the wheels are so arranged that in the event of the feed wire 19 becoming displaced from the groove of the trolley wheel 14 and moving laterally onto either restoring wheel, the spiral groove in the latter will direct the wire into the groove of the trolley wheel. It being understood that during this operation the particular restoring wheel upon which the feed wire rests, will be rotated by virtue of the frictional engagement between it and the feed wire.

The restoring wheels 12, 12 like the trolley wheel 14, will, of course, be of metal and good conductors of electricity. The frictional contact between these wheels will under ordinary circumstances, be sufficient to conduct electricity to the motor of the car when either restoring wheel is on the wire. In order to produce a side thrust on the trolley wheel and, therefore further insure of the electricity being conducted to the trolley wheel in the event of either of the restoring wheels bearing on the feed wire, I make use of a thrust an embodiment of which is shown in Fig. 3. In this connection it will be observed that the washers 20, 20 are interposed between the hubs 21, 21 of the restoring wheels and the opposite faces of the hub of the trolley and are adapted to loosely receive the axle 7. 22, 22 indicate rods connected with radial extensions 23, 23 of the washers and slidingly fitted in lugs 24, 24 on the hubs 21, 21 of the restoring wheels. 25, 25 indicate collars secured to the rods 22, 22, and 26, 26 indicate thrust springs surrounding the rods and adapted to force the washers 20, 20 in contact with the trolley wheel 14. In this connection it will be observed that the rods 22 are of metal and all the parts good conductors of electricity.

27 indicates an oil chamber formed in the axle 7, and 28 an inlet extending through the head 10 and opening through the end portion of the side 6 of the harp.

29 indicate outlets from the chamber 27 which communicate with the bearings of the trolley wheel and restoring wheels.

By preference the device just described is employed with a switch plate such as shown in Figs. 1 and 4, wherein the oblong body 30 of the plate is provided on its lower face with a passage 31 which divides at one end of the plate as shown at 32. The outer sides 33 of the passages 31 and 32 are formed by downturning marginal portions of the body 30, and so also are the inner sides 34 of the passages 32 formed by downturning the edges of the angular-shaped recess formed in one end of the plate. The feed wires 35 extend for a short distance in the passages 31 and 32 and are secured to the body 30 in any preferred manner. When the head formed by the restoring and trolley wheels enters the passage 31 or either of the passages 32, the restoring wheels 12, 12 will bear on the body 30 and be arranged between the side walls of said passages. When the head enters the curved passage to the right in Fig. 4, which, of course, it will be forced to do by the car's moving in the direction of the said curved passage, one of the restoring wheels, namely that bearing on the side of the passage having the greater radius, will move faster than the one bearing on the opposite side of the passage. This differential movement of the restoring wheels prevents accidental displacement of the head from the switch.

Although I have shown and described one embodiment of my invention it is to be understood that I am not to be limited to the specific arrangement and construction of parts since various changes will be made, within the scope of the appended claim without departing from the spirit or sacrificing any of the advantages of the invention.

What I claim as new is:

The combination with a trolley harp, and an axle connected thereto; of a pair of restoring wheels journaled on the opposite end portions of said axle, and guides carried by the restoring wheels, a trolley wheel interposed between said restoring wheels, coöperating metallic contact elements interposed between said restoring wheels and the trolley wheel, and means for yieldingly holding said elements in contact with the trolley wheel and comprising spring-pressed pins arranged in said guides.

In testimony whereof I affix my signature in presence of two witnesses.

MARTIN A. BORN.

Witnesses:
  HERMAN R. E. BORN,
  FRIEDRICK BORN.